United States Patent
Basch et al.

(10) Patent No.: US 7,313,207 B2
(45) Date of Patent: Dec. 25, 2007

(54) REDUCING MEMORY USAGE IN NONCOHERENT SIGNAL PROCESSING

(75) Inventors: Julien Basch, South San Francisco, CA (US); Andrew Chou, South San Francisco, CA (US); Robert Lorenz, Menlo Park, CA (US); Jesse Stone, Palo Alto, CA (US)

(73) Assignee: SiRF Technology, Inc., San Jose, CA (US)

( * ) Notice: Subject to any disclaimer, the term of this patent is extended or adjusted under 35 U.S.C. 154(b) by 700 days.

(21) Appl. No.: 10/765,651

(22) Filed: Jan. 26, 2004

(65) Prior Publication Data

US 2004/0158593 A1    Aug. 12, 2004

(51) Int. Cl.
*H03D 1/00* (2006.01)
(52) U.S. Cl. ...................................... 375/343; 708/422
(58) Field of Classification Search ................ 375/343, 375/150, 142; 708/422
See application file for complete search history.

(56) References Cited

U.S. PATENT DOCUMENTS

| 4,943,974 A | * | 7/1990 | Motamedi | 375/149 |
| 5,329,549 A | * | 7/1994 | Kawasaki | 375/150 |

* cited by examiner

*Primary Examiner*—David C. Payne
*Assistant Examiner*—Rahel Guarino
(74) *Attorney, Agent, or Firm*—Jonathan W. Hallman; MacPherson Kwok Chen & Heid LLP

(57) ABSTRACT

A method for detecting a positioning signal includes (a) correlating a segment of a received positioning signal with a reference signal of a selected code phase and frequency to obtain a correlation value, (b) if the correlation value is less than a predetermined minimum, assigning the correlation value to the predetermined minimum, and (c) accumulating the correlation value in a sum of correlation values obtained using other segments of the received positioning signal. In addition, the correlation value may be reduced by a predetermined value, which is preferably an expected mean value for a noise component in the segment of the received positioning signal.

7 Claims, 2 Drawing Sheets

REDUCING MEMORY USAGE IN NONCOHERENT SIGNAL PROCESSING

BACKGROUND OF THE INVENTION

1. Field of the Invention

The present invention relates to signal detection techniques. In particular, the present invention relates to reducing memory usage in systems and methods that use non-coherent accumulation in detecting signals.

2. Discussion of the Related Art

A receiver of a navigation system detects positioning signals from the Global Positioning System (GPS) to estimate its location. One common detection method uses non-coherent accumulation, which is a technique for searching for the code phase and frequency of a received signal involving accumulating either the modulus, or the squared modulus, of complex correlations of a reference signal and the received signal. Depending upon the relative amount of signal and noise present in the received signal, the correlation values will have different distributions. Typically, an accumulated sum is stored in memory for each trial combination of code-phase and frequency. Signal detection occurs when the statistical properties of an accumulated sum indicate that a signal is almost certainly present. Memory is a significant cost in such a navigation system, as a large number of such accumulated sums are kept in memory to achieve high resolution in detection.

A number of U.S. patent applications disclose applicable signal processing techniques relevant to a navigation system of the present application:

1. Signal Acquisition using Data Bit Information (Ser. No. 09/888,228filed Jun. 22, 2001, now U.S. Pat. No. 6,512,379;
2. Synthesizing Coherent Correlation Sums at One or Multiple Carrier Frequencies Using Correlation Sums Calculated at a Coarse Set of Frequencies (Ser. No. 09/888,227), filed Jun. 22, 2001, now U.S. Pat. No. 7,164,736;
4. Extracting Fine-Tuned Estimates from Correlation Functions Evaluated at Limited Number of Values (Ser. No. 09/888,338, "the '338 patent application"), filed Jun. 22, 2001, now U.S. Pat No. 7,027,534;
5. Determining the Spatio-Temporal and Kinematic Parameters of a Signal Receiver and its Clock by Information Fusion (Ser. No. 09/888,229), filed Jun. 22, 2001, now U.S. Pat No. 6,542,116;
6. Determining Location Information Using Sampled Data Containing Location Determining Signals And Noise (Ser. No. 09/888,337), filed Jun. 22, 2001, now U.S Pat. No. 6,535,163;
7. Method for optimal search scheduling in satellite acquisition (Ser. No. 10/126,853), filed on Apr. 19, 2002, now U.S. Pat. No. 6,836,241;
8. System and method to estimate the location of a receiver in a multi path environment (Ser. No. 10/237,556), filed on Sep. 6, 2002, now U.S. Pat. No. 7,030,814;
9. System and method to estimate the location of a receiver (Ser. No. 10/237,557), filed on Sep. 6, 2002, now U.S. Pat. No. 7,069,109; and
10. Multifunction device with positioning system and shared processor (Ser. No. 10/286,360), filed on Nov. 1, 2002, now U.S. Pat. No. 7,132,980.

The above copending patent applications, which are each assigned to SirF Technology, Inc., are hereby incorporated by reference in their entirety.

SUMMARY OF THE INVENTION

In a signal detection application, the present invention provides a method for reducing the memory requirements for storing accumulated sums in memory. According to one embodiment of the present invention, the dynamic range of the accumulated sum is quantized to a specified finite number of values. To efficiently use memory, the dynamic range is allocated to the signal portion, rather than the noise portion, of the accumulated sum.

Thus, according to one embodiment of the present invention, a method for detecting a positioning signal includes (a) correlating a segment of a received positioning signal with a reference signal of a selected combination of code phase and frequency to obtain a correlation value, (b) if the correlation value thus obtained is less than a predetermined minimum, assigning the correlation value to the predetermined minimum, and (c) accumulating the correlation value in a sum of correlation values obtained using other segments of the received positioning signal. In addition, the correlation value may be reduced by a predetermined value. In one embodiment, the correlated value is reduced by an expected mean value for a noise component in the segment of the received positioning signal.

In one embodiment, the correlation value is quantized, with the predetermined minimum value corresponding to the least quantized correlation value.

In one embodiment, the sum of correlated values is compared to a predetermined threshold value corresponding to the greatest quantized value. When the sum of the correlated values exceeds the predetermined threshold value, the accumulating of the sum of correlated values is not further carried out for additional segments of the received positioning signal.

The methods of the present invention provides a memory-efficient non-coherent accumulation.

The present invention is better understood upon consideration of the detailed description below and the accompanying drawings.

DETAILED DESCRIPTION OF THE PREFERRED EMBODIMENTS

The present invention provides a system and a method that improves memory usage efficiency of signal detection using non-coherent accumulation over systems and methods of the prior art. In a conventional GPS application, for example, a received positioning signal of a certain duration is divided into a large number of segments, say N, and correlated with a locally generated replica of the expected GPS signal (i.e., the code expected to be received from a GPS satellite, modulated by the expected carrier signal). If the sequence of the N complex correlation values thus computed is denoted by $x_i$, a non-coherent accumulation of the modulus of $x_i$ can be defined as:

$$\sum_{i=1}^{N} |x_i|$$

Alternatively, the accumulated value can be a sum of the squared modulus of $$x_i \left( \text{i.e.,} \sum_{i=1}^{N} |x_i|^2 \right),$$

or some other power of $x_i$, to optimize memory usage, detection sensitivity or other performance parameters.

Let $\sigma^2$ denote the noise power in each of the real and imaginary parts of $x_i$ (i.e., the total noise power is $2\sigma^2$), and let M denote the probability distribution of $|x_i|$, which are assumed identically distributed. If the received signal contains only Gaussian white noise, then the probability density function of $f(M)$ follows a Rayleigh distribution:

$$f(M) = \frac{M}{\sigma^2} e^{\frac{M^2}{2\sigma^2}}$$

with a mean of M given by $$\mu = \sqrt{\frac{\pi}{2}} \sigma$$

and a standard deviation of M given by $$\sigma_M = \sqrt{2 - \frac{\pi}{2}} \sigma.$$

However, if the received signal contains a GPS signal, then let S denote the carrier to noise ratio $$\frac{C}{N_0}$$

for the received signal, and the probability density function $f^{SIG}(M)$ follows a Ricean distribution:

$$f^{SIG\sigma^2}(M) = \frac{M}{\sigma^2} e^{\frac{M^2+a^2}{2\sigma^2}} I_0\left(\frac{aM}{\sigma^2}\right)$$

with a mean of M given by $$\mu_M = \frac{\pi}{2}\sigma\left((1+r)I_0\left(\frac{r}{2}\right) + rI_1\left(\frac{r}{2}\right)\right)e^{-\frac{r}{2}}$$

where $$r = T\left(10^{\frac{S}{10}}\right),$$

T being the coherent block size in seconds, and $I_0$ being the zero-th order modified Bessel function of the first kind.

Figure 1:
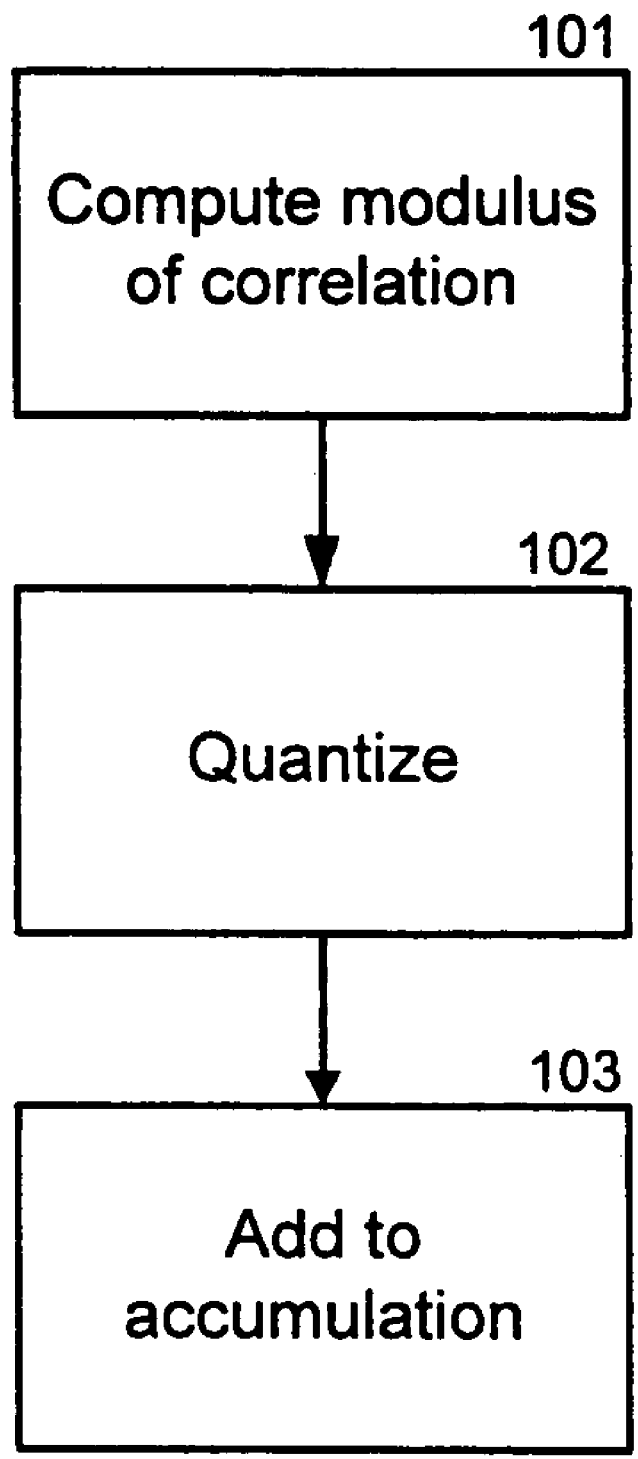
FIG. 1 illustrates a process of non-coherent accumulation.

FIG. 1 outlines generally the steps in a process providing non-coherent accumulation. As shown in FIG. 1, at step 101, the modulus of a correlation value over a segment of the received signal is calculated. At step 102, which is an optional step, the modulus of the correlation value is quantized. At step 103, the modulus is added to a sum accumulating the modulus of correlation values of all the segments of received signal. The quantization performed at step 102 allows the accumulating sum to be represented by a lower precision than the precision of the computation in step 101. In determining the appropriate quantization, the memory costs is balanced against the precision loss due to quantization. In one embodiment, a quantization of $$\frac{\sigma}{2}$$

is applied. In the $$\frac{\sigma}{2}$$

quantization, the modulus of the correlation value is divided by $$\frac{\sigma}{2}$$

and the result is then rounded to the nearest integer. Alternatively, instead of rounding, a floor or ceiling function can be applied.

Non-coherent accumulation achieves two functions. First, signal detection is achieved by comparing the accumulated sum to the expected probability distribution of a received signal that contains only noise. When the accumulated sum differs from that expected probability distribution in a statistically significant way, a signal is deemed detected. Second, upon detection, the frequency and code phase estimates can be further refined by interpolating accumulation values near the peak accumulation. In other words, the code phases and frequencies near the peak accumulation can be used to further improve the estimates of code phase and frequency.

Figure 2:
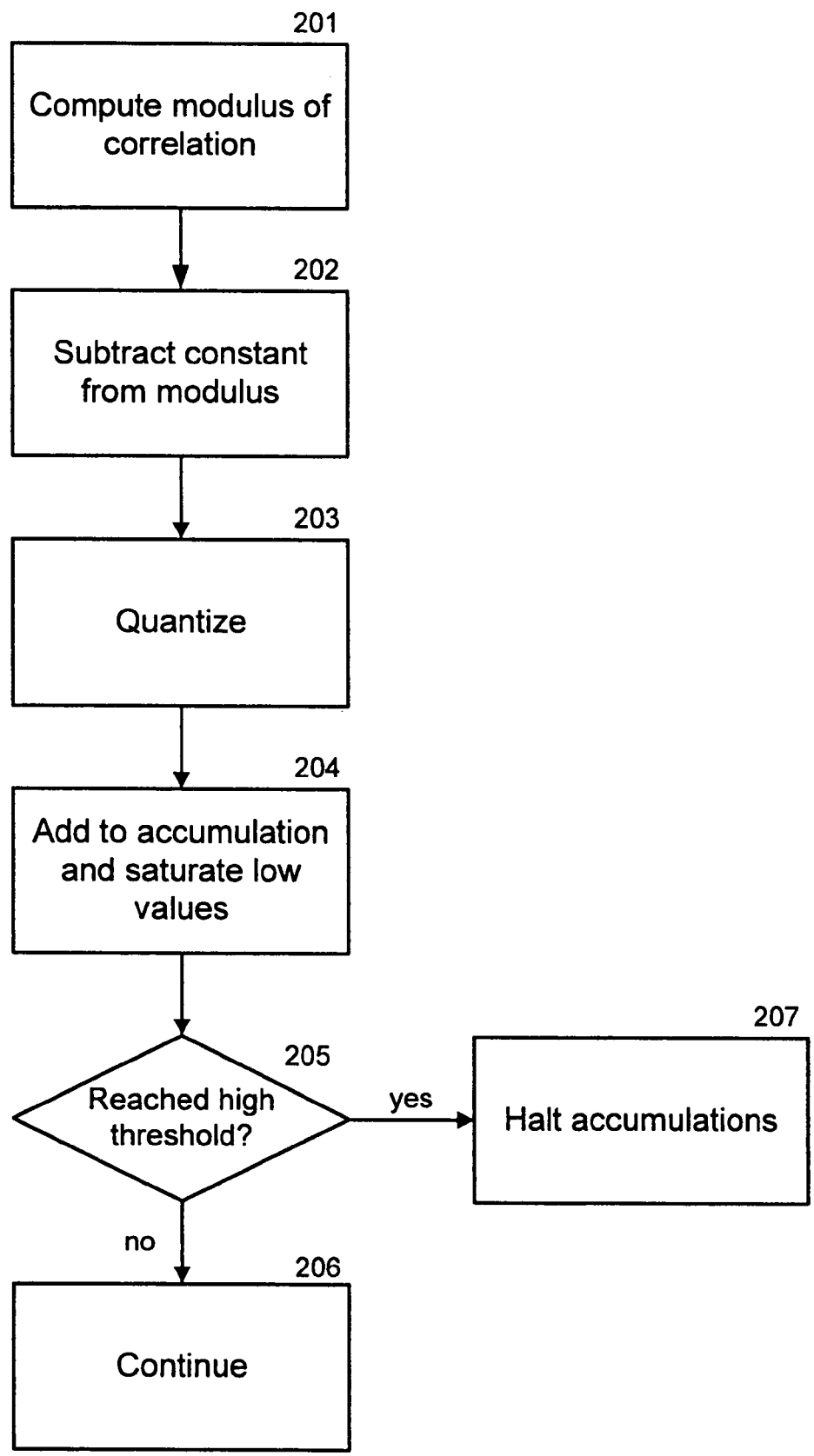
FIG. 2 illustrates a process providing non-coherent accumulation with reduced memory usage, in accordance with one embodiment of the present invention.

FIG. 2 illustrates in further detail a process providing non-coherent accumulation with reduced memory usage, in accordance with one embodiment of the present invention. As shown in FIG. 2, at step 201, the modulus of a correlation value over a segment of the received signal is computed. At step 202, the modulus calculated at step 201 is reduced by a predetermined value. In one embodiment, the modulus is reduced by the expected value of the noise-only modulus $$\left( \text{i.e., } \sigma_M = \sqrt{2 - \frac{\pi}{2}} \sigma. \right).$$

At step 203, the reduced modulus is quantized. (Although reduction of the modulus by $\sigma_M$ is described above as being carried out at step 202 before quantization step 203 at a higher precision, reduction of the modulus can also occur after quantization, using a quantized value of $\sigma_M$)

At step 204, the quantized reduced modulus is accumulated in an accumulated sum. If the accumulated sum is less than a specified minimum value L, the accumulation sum is set to L (the "saturation" step). The saturation step sacrifices the ability to distinguish among low accumulations. However, for an appropriately chosen minimum value L, as the low accumulations are highly unlikely to contain a detectable positioning signal, the impact of the saturation step on signal detection is negligible. In one embodiment, where non-coherent accumulations are stored using 8 bits and the quantization is achieved by dividing by $$\frac{\sigma}{2},$$

the minimum value L is set to −8. L may be set to a value even less than −8 to further reduce the impact due to the saturating step on the distribution of the accumulated sum. L may also be set to a value higher than −8 to provide a larger useful dynamic range.

In step 205, the accumulation sum is compared against a high threshold value H. If the accumulated sum exceeds the high threshold value H, accumulations for the satellite of the current search are halted, so that all accumulations will have processed the same amount of received signal. By halting accumulations, the accumulations near the peak are not saturated, and methods such as those described in the '338 application can be applied to further refine estimates of code phase and frequency. In the embodiment described above (i.e., 8-bit accumulations, $$\frac{\sigma}{2}$$

quantization, and minimum value L=−8), a high threshold value H is set to the maximum quantized value, given by 255−8=247. Alternatively, high threshold value H may be a value less than the maximum value to avoid flattening the shape of the ambiguity peak when the last term in the accumulated sums is added. If the high threshold value H is not met, then the signal is detected by comparing the accumulated sums to a lower threshold determined according to the applications incorporated above.

According to the embodiment of the present invention described above, memory usage in the non-coherent accumulation is greatly reduced, while still allowing signal detection and estimation refinement.

The above detailed description is provided to illustrate the various embodiments of the present invention and is not intended to be limiting. Numerous modifications and variations within the scope of the present invention are possible. The present invention is set forth in the claims below.

We claim:

1. A method for detecting a positioning signal, the positioning signal being divided into segments, comprising:
    processing each segment in a subset of the segments by:
        correlating the segment with a reference signal of a selected code phase and frequency to obtain a complex correlation value;
        processing the complex correlation value to provide a non-coherent correlation value;
        summing the non-coherent correlation value with a previously-calculated non-coherent integration sum to provide a current non-coherent integration sum;
        if the current non-coherent integration sum is less than a predetermined minimum, assigning the current non-coherent integration sum to the predetermined minimum; and
    processing the current non-coherent integration sum to determine whether the positioning signal is detected according to the selected code phase and frequency.

2. A method as in claim 1, wherein processing the complex correlation value includes obtaining a modulus of the complex correlation value and reducing the modulus by a predetermined value.

3. A method as in claim 2, wherein the modulus is reduced by an expected mean value for a noise component in the positioning signal.

4. A method as in claim 3, wherein processing the complex correlation value includes quantizing the modulus.

5. A method as in claim 1, wherein processing the current non-coherent integration sum includes comparing the current non-coherent integration sum to a predetermined threshold value.

6. A method as in claim 1, wherein the subset of segments comprises all of the segments in the positioning signal.

7. A method as in claim 1, wherein a size of the subset of segments is less than all of the segments in the positioning signal, the size of the subset being determined by whether the current non-coherent integration sum exceeds a maximum value.

* * * * *